United States Patent
Wexler et al.

(10) Patent No.: US 11,061,785 B2
(45) Date of Patent: Jul. 13, 2021

(54) SYSTEM AND METHOD FOR ON-DEMAND WARM STANDBY DISASTER RECOVERY

(71) Applicant: SailPoint Technologies, Israel Ltd., Ramat Gan (IL)

(72) Inventors: Shlomi Wexler, Udim (IL); Itay Maichel, Ra'anana (IL); Shachar Radoshinsky, Petach Tikva (IL)

(73) Assignee: SailPoint Technologies, Israel Ltd., Ramat Gan (IL)

( * ) Notice: Subject to any disclaimer, the term of this patent is extended or adjusted under 35 U.S.C. 154(b) by 43 days.

(21) Appl. No.: 16/694,528

(22) Filed: Nov. 25, 2019

(65) Prior Publication Data

US 2021/0157690 A1 May 27, 2021

(51) Int. Cl.
*G06F 11/20* (2006.01)
*G06F 11/14* (2006.01)

(52) U.S. Cl.
CPC ...... *G06F 11/2023* (2013.01); *G06F 11/1417* (2013.01); *G06F 11/2028* (2013.01); *G06F 2201/86* (2013.01)

(58) Field of Classification Search
CPC ............. G06F 11/2023; G06F 11/2028; G06F 11/1417; G06F 11/3006; G06F 11/3055; G06F 2201/86
See application file for complete search history.

(56) References Cited

U.S. PATENT DOCUMENTS

| | | | | |
|---|---|---|---|---|
| 2004/0153700 A1* | 8/2004 | Nixon | ...................... | G05B 9/03 714/4.1 |
| 2008/0263390 A1* | 10/2008 | Baba | ................... | G06F 11/1484 714/4.1 |
| 2012/0272091 A1* | 10/2012 | Sekiguchi | ........... | G06F 11/2028 714/3 |
| 2019/0102260 A1* | 4/2019 | Yang | ................... | G06F 11/3055 |

OTHER PUBLICATIONS

A. L. Gouharand A. Ali, "Power savings in servers infrastructure under backup and availability constraints," 2018 International Conference on Advancements in Computational Sciences (ICACS), Lahore, 2018, pp. 1-8, doi: 10.1109/ICACS.2018.8333487. (Year: 2018).*

* cited by examiner

Primary Examiner — Bryce P Bonzo
Assistant Examiner — Albert Li
(74) *Attorney, Agent, or Firm* — Sprinkle IP Law Group

(57) ABSTRACT

Systems and methods for a service based disaster recovery system are disclosed. Embodiments may include the ability to configure and deploy a DR environment, including providing the ability to configure a DR service in the DR environment for one or more deployed primary services in a primary environment. An environment management database holds DR configuration data including the status of the deployed services. An environment manager may interact with the environment management database to determine an associated action for the services. The services may perform activation (e.g., wake up) or enter a standby mode (e.g., sleep) depending on the determined action.

18 Claims, 9 Drawing Sheets

FIG. 7

File Access Manager Installation

● General Configuration

Server Settings
Add a Server

Server FQDN: siq-mtz-ishay
Server Local Name: siq-mtz-ishay
Installation Path: C:\Program Files\SailPoint
Logs Path: C:\Program Files\SailPoint\Logs
Disaster Recovery

[Reset] [Deactivate]    [Cancel] [Save]

Server List

| FQDN | Type | Local Name | Status | Installation Path | Logs Path | | |
|---|---|---|---|---|---|---|---|
| siq-mtz-ishay | Production | siq-mtz-ishay | Active | C:\Program Files\SailPoint | C:\Program Files\Sail... | ✎ | ✕ |
| siq-mtz-ishay2 | Production | siq-mtz-ishay2 | Active | C:\Program Files\SailPoint | C:\Program Files\Sail... | ✎ | ✕ |
| siq-mtz-ishay3 | Production | siq-mtz-ishay3 | Active | C:\Program Files\SailPoint | C:\Program Files\Sail... | ✎ | ✕ |
| siq-mtz-ishay4 | DR | siq-mtz-ishay4 | | C:\Program Files\SailPoint | C:\Program Files\Sail... | ✎ | ✕ |
| siq-w2016-x64-2... | DR | siq-w2016-x64-2 | | C:\Program Files\SailPoint | C:\Program Files\Sail... | ✎ | ✕ |
| siq-w2019.office... | DR | siq-w2019 | | C:\Program Files\SailPoint | C:\Program Files\Sail... | ✎ | ✕ |

[Cancel]    [Back] [Next]

SYSTEM AND METHOD FOR ON-DEMAND WARM STANDBY DISASTER RECOVERY

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records but reserves all other copyright rights whatsoever.

TECHNICAL FIELD

This disclosure relates generally to the fault tolerance of computer systems. In particular, this disclosure relates to the implementation of disaster recovery in a computing infrastructure. Specifically, embodiments relate to systems and methods for disaster recovery that provide efficient and controlled failover in a distributed multi-services computing environment. Even more specifically, embodiments relate to systems and methods for disaster recovery that provide controlled one-click, hot-standby disaster recovery for distributed multi service computing environments.

BACKGROUND

In today's modern world it is now typical for an enterprise (e.g., a business entity, corporation, institution, organization, government agency, a non-profit organization, or the like) to utilize a highly complex distributed computing environment (e.g., a collection of computing devices such as servers, desktops, laptops or the like all connected via a computing network). Such a computer environment is used by enterprises so that their personnel can access and utilize certain software applications and data. The continuous availability of the computer systems of these enterprise environments is vital to the operation of these enterprises.

Thus, these enterprises take tremendous steps to ensure availability of these systems and data and to minimize what is referred to as "down-time" for these systems. These down-times can be caused by facility disaster, natural disasters, hardware failures, software application failures, purposeful attacks from virus or simply scheduled (e.g., periodic) maintenance of one or more of the computer systems. From the perspective of the enterprise, however, the cause of the down-time is less germane than its effects. When users of an enterprise cannot access that enterprise's systems, those users may not be able to perform their duties in an adequate capacity, reducing or interrupting the functioning of the enterprise, and in turn possibly reducing the enterprise's productivity or profitability.

To address these down-time issues many enterprises have implemented some form of disaster recovery (DR). Disaster recovery involves a set of policies, computing infrastructure, tools or procedures to enable the recovery or continuation of vital technology infrastructure and systems following a natural or human-induced disaster or other cause of failure or downtime for a primary (also referred to as a production) computing environment. Disaster recovery configurations are used in some cases to provide protection against loss of data due to failures, not only in the computer systems themselves but in the surrounding environment (e.g. loss of electrical power, acts of nature, fire, etc.).

Many of these DR configurations involve maintaining a dormant replica of servers of the primary computing environment at a secondary site or environment that is usually geographically separated from the primary environment by hundreds of miles or more (e.g., to protect against natural disasters, power grid failures, etc.). The state of the servers at the secondary site are synchronized with the state of the corresponding server at the primary site in order to reduce disruption when service is switched over to the secondary site upon loss of the server at the primary site. Accordingly, as each server within the primary computing environment at the primary site may have a number of applications (also referred to herein as services) executing thereon, a corresponding server within the DR computing environment at the secondary site will thus have those same applications (e.g., in the same state) executing on that server.

In modern computing distributed enterprise computing environments then, with hundreds or thousands (or more) distributed servers with associated services, it becomes highly impractical to mirror the state of a primary enterprise computing environment at a secondary site. Consequently, the deployment of DR solutions with respect to these multiple services deployed on multiple servers usually requires either a tedious manual process or a third-party orchestration tool to failover to the secondary DR site.

What is desired therefore, are improved systems and methods for integrated solutions for disaster recovery that provide for the simple configuration of primary or secondary DR environments, and substantially automated failover and recovery in association with these sites.

SUMMARY

As mentioned, to address down-time issues many enterprises have implemented some form of disaster recovery. Many of these DR configurations involve maintaining a dormant replica of servers of the primary computing environment at a secondary site or environment that is usually geographically separated from the primary environment. The state of the servers at the secondary site are synchronized with the state of the corresponding server at the primary site in order to reduce disruption when service is switched over to the secondary site upon loss of the server at the primary site. Accordingly, as each server within the primary computing environment at the primary site may have a number of applications (also referred to herein as services) executing thereon, a corresponding server within the DR computing environment at the secondary site will thus have those same applications (e.g., in the same state) executing on that server.

This requirement is impractical, as it requires an almost one to one correspondence between the configuration of the primary site and the DR site. Specifically, modern computing distributed enterprise computing environments then may have hundreds or thousands (or more) distributed servers with associated services. These services may be deployed on specific servers within the primary computing environment. To mirror this configuration then, a corresponding DR site may be required to have the same number of servers with the same service deployed on those servers in a manner that reflects or mirrors the deployment of those services within the primary computing environment. Moreover, when a failover is necessitated, this failover may be required to performed in a multi-step process, either manually or using previously configured third-party orchestration tool. Improved systems and methods for disaster recovery that provide for the simple configuration of primary or DR environments, and substantially automate failover and recovery in association with these sites.

To address these needs and problems, among others, embodiments as disclosed are directed to systems and methods for a service based disaster recovery system for a computing environment that includes a primary environment (also referred to herein interchangeably as a site) having primary servers with primary services, and a DR environment having DR servers with DR services. At a high level, embodiments may include the ability to configure and deploy the DR environment (e.g., through a configuration interface), including providing the ability to configure a DR service for one or more deployed primary services in the primary environment. An environment management database holds DR configuration data including the status of each service deployed in the computing environment. An interface may be used to initiate or terminate a failover for the entire computing environment or for a single server or service. Code or other logic built into the services may identify an associated current state for the service and perform activation (e.g., wake up) or enter a standby mode (e.g., sleep) depending on the identified state.

Specifically, in certain embodiments, a service based disaster recovery system may include an environment management database storing a DR configuration, comprising a representation of the servers of each computing environment, a designation whether each server is part of the primary environment or the DR environment, a representation of the services of each computing environment, an identification of the server on which each of the services is deployed, and mappings between corresponding services in the primary and DR computing environments. Thus, the DR configuration may include DR configuration data on primary servers of the primary computing environment, the primary services of the primary computing environment, and the primary servers on which those primary services are deployed (e.g., are executing). The DR configuration may also include DR configuration data on servers of the DR computing environment, the DR services of the DR computing environment, the DR servers on which those DR services are deployed, and a mapping between each DR service and a corresponding primary service.

The environment management database may provide an interface through which requests for this DR configuration data may be requested or retrieved. For example, this interface may receive a request for DR configuration data for a particular service (e.g., as referenced by the service identifier (ID) for that service) and may return associated DR configuration data for that service (e.g., associated with the service ID for that service in the DR configuration data stored in the environment management database), including for example, the server on which the service is deployed, the status or other data associated with that server, the identification of any corresponding service and the status of the corresponding service or the server on which that corresponding service is installed.

This DR configuration may, for example, be established by a user or administrator associated with an enterprise when the enterprise is establishing the DR computing environment. To aid in configuring the DR computing environment, the DR system of embodiments may provide a DR interface such as Graphical User Interface (GUI) or the like that interacts with the environment management database and may be used to by a user to designate a DR configuration for a computing environment, including defining primary servers and primary services of a primary computing environment and DR servers and DR services of a DR computing environment, designating a primary server of the primary computing environment on which each primary service is deployed, designating a DR server of the DR computing environment on which each DR service is deployed, and designating a correspondence between primary services in the primary computing environment and DR services in the DR computing environment. In this manner, a primary service on a primary server and a DR service on a DR server may be defined as a DR service pair through the DR configuration data maintained at the environment management database.

The service based disaster recovery system may also include an environment manager that may be utilized by each of the services (e.g., primary or DR services) deployed in each of the primary or DR computing environments This environment manager may be code or a library incorporated into, or accessed by, a service. The environment manager may also be deployed remotely from the service, and can be implemented, for example, as its own service (such as a web service or the like) that may be accessed by a service through an interface such as a web services interface or Application Programming Interface (API) or the like). The environment manager may provide an interface through which a service can check to see if any action is required by that service (e.g., if that service should be asleep or awake).

In normal operation then, the primary services deployed in the primary environment are awake (or active). In other words, they may be actively servicing requests to allow users (e.g., human or machine) to access the services or functionality that they provide. Conversely, the DR services deployed in the DR computing environment are asleep or inactive. Thus, the DR services may not be actively servicing requests or may not be allowing users to access the services or functionality that they provide. However, even when asleep or inactive, these DR services may still be up and running in a standby mode awaiting activation (e.g., to be given a "wake up" action, as will be discussed).

Accordingly at regular intervals (e.g., using a heartbeat message or the like) each service (e.g., both primary services and DR services) may report its status to the environment management database, which may record the status of that service in association with the representation of that service. The environment management database can then update the DR configuration data with a status for the service and the last time a message was received through the service. In some embodiments, this heartbeat message may be sent through the environment manager. In these types of embodiments, the environment manager may also offer an interface for such heartbeat message such that a service may report a status through that interface and the environment manager, in turn, may report that status to the environment management database.

Additionally, at regular intervals (which may be a different interval or the same interval as the heartbeat messages), each service may send a request or otherwise access the interface of the environment manager to determine if the service should take an action. More specifically, the service may access the interface of the environment manager with a service ID for the service to request an action check for the service. The environment manager can then return an action to take to the requesting service, where this action may be a wake action or a sleep action. If the action is a wake action, and the service is not already awake, the service may wake up (e.g., by beginning to actively service requests to allow users to access the services or functionality that the service provides). If the service is already awake the service may wait for the expiration of the checking interval before checking again with the environment manager. If the action is a sleep action, and the service is not currently asleep, the service may go to sleep (e.g., by stopping the servicing of requests or stopping the access of users to the services or functionality that the service provides). If the service is already asleep the service may wait for the expiration of the checking interval before checking again with the environment manager.

When the environment manager receives a request from a service, therefore, it will make a determination of the action to return to the requesting service. To make such a determination, embodiments of an environment manager may request DR configuration data associated with the service ID for the service from the environment management database. In response to this request, the environment management database may return the DR configuration data associated with the service, including DR configuration data on the server on which the service is deployed (e.g., including, for example, if that server is down). Moreover, if the requesting service is part of a DR service pair, the environment management database may return DR configuration data on any corresponding service (e.g., if the service is a primary service, the corresponding service may be a corresponding DR service while if the service is a DR service the corresponding service may be a primary service) or server on which a corresponding service is deployed.

When the environment manager receives the DR configuration data associated with the requesting service from the environment management database, it can be determined if a corresponding service exists (or has been configured) from the DR configuration data associated with the service returned from the environment management database. If a corresponding service does not exist the environment manager may return a wake action to the requesting service. If however, a corresponding service exists it can then be determined if the corresponding service is installed. This installation may mean that not only does the corresponding service exist but that, additionally, the service has been configured with a particular server and is executing on that server. If a corresponding service is not installed, the environment manager may return a wake action to the requesting service.

If a corresponding service is installed, the environment manager can then determine if the corresponding service is awake. If a corresponding service is awake the environment manager may return a sleep action to the requesting service. If the corresponding service is not awake, the environment manager can then determine if the primary server of primary service of the DR pair (e.g., a primary service and corresponding DR service) including the requesting service is down. If the primary server is down and the requesting service is the primary service of the DR service pair the environment manager may return a sleep action to the requesting service, while if the requesting service is not the primary service the environment manager may return a wake action to the requesting service. Similarly, If the primary server is not down and the requesting service is the primary service of the DR service pair the environment manager may return a wake action to the requesting service, while if the requesting service is not the primary service the environment manager may return a sleep action to the requesting service.

When the requesting service receives the action returned by the environment manager the requesting service can then take an appropriate action based on the type of the returned action. If the returned action is the same as the current state of the service the service may take no further action until the expiration of the checking interval at which point the service may once again requesting an action from the environment manager. However, if the requesting service is asleep and the action is a wake action the service may wake up (e.g., by beginning to actively service requests to allow users to access the services or functionality that the service provides) and if the returned action is a sleep action and the service is not currently asleep, the service may go to sleep (e.g., by stopping the servicing of requests or spotting the access of users to the services or functionality that the service provides). To ensure that both services of the DR pair are not simultaneously awake, in some embodiments before a service wakes up it may check the status of the corresponding service of the DR pair as returned in the DR configuration data to ensure the corresponding service is idle or has not been active (e.g., as determined from its heartbeat message) for a certain threshold amount of time.

Embodiments may thus provide for single-server or even single service fail over. In particular, embodiments may provide an interface by which a user (e.g., an administrator associated with an enterprise or the like) may initiate a fail over by designating a server (e.g., a primary server in the primary environment) or even a particular service (e.g., a primary service in the primary environment) as down. Such a designation may be made, for example, using the DR configuration interface as previously discussed or through a separate interface associated with the environment management database. This interface may interact with the environment management database to indicate that the server or service indicated as down by the user through the interface is indicated as such in the DR configuration data associated with that server or service. Thus, when the respective services of any DR service pairs associated with the server that the user marked as down next requests an action status (e.g., through the environment manager), the DR configuration data returned to the environment manager from the environment management database for that service will indicate the status of the server marked as down by the user. Each of the respective services of the DR service pairs associated with that service can then take the appropriate (e.g., wake or sleep) actions (e.g., without any further user involvement). Consequently, when a primary server is indicated as down by a user, the corresponding DR service for each primary service deployed on that server will wake up and become active without any further involvement from the user, while each primary service deployed on the indicated primary server will sleep (if needed) without any further user involvement.

Similarly, the user may interact with the same interface to designate a server (or service) as up (e.g., when it is desired to restore the server). The interface may interact with the environment management database to indicate that the server designated as up is indicated as such in the DR configuration data associated with that server. Thus, when the respective services of any DR service pairs associated with the server the user marked as up next requests an action status (e.g., through the environment manager) the DR configuration data returned to the environment manager from the environment management database for that service will indicate the status of the server marked as up by the user. Each of the respective services of the DR service pairs associated with that service can then take the appropriate actions (e.g., without any further user involvement). Thus, when a primary server is indicated as up by a user, the corresponding DR service for each primary service deployed on that primary server will go to sleep without any further involvement from the user, while each primary service deployed on the indicated primary server will wake up without any further user involvement.

As can be seen then, embodiments as disclosed provide a number of advantage over previous failover tools and methodologies. For example, embodiments may allow simple (e.g., "one-click") on demand failover or recovery for services and, moreover, may provide this functionality without the need for a third-party orchestration tool. Such functionality may also be accesses by users through a single tool or interface that allows both configuration of the DR environment and the ability to institute failover or recovery from the same interface or tool. Accordingly, embodiments may save deployment time and remove the complexity of deploying a DR solution in computing environment while simultaneously shortening the time required to failover a computing system during a disaster (e.g., from hours to minutes), thus preventing data loss and extending system uptime.

Additionally, embodiments may allow quick and seamless implementations of such failover and recovery, as DR services in the DR environment are never fully inactive and may be up and running in a standby mode waiting to activate based on associated DR configuration data. This type of functionality can be referred to as a "hot-standby" mode of operation. Embodiments are thus server or service centric, meaning that individual servers or services may be taken down or restored and each service may individually access the DR configuration data of the environment management database associated with that service to make an individual determination about the status of that service and take a corresponding action with respect to that service (e.g., wake up or go to sleep). In this manner, embodiments may free the DR computing environment from the constraints of having to mirror the primary computing environment, as there no longer have to be an identical number (or type) of servers in the DR environment, and services no longer have to be deployed on identical servers. More generally, then, the servers in the DR computing environment do not have to be equivalent to (e.g., either in processing power or in number or otherwise) to those in the primary environment. As each service may be make individual determinations it is relatively easy to integrate new services into such a computing environment and provide disaster recovery with respect to these newly integrated services.

In one embodiment, an environment management database stores DR configuration data on a primary computing environment comprising a primary server and a primary service deployed on the primary server and a disaster recovery (DR) environment comprising a DR server and a DR service deployed on the DR server. The DR service corresponds to the primary service and the DR configuration data includes DR configuration data on the primary server, the primary service, the DR server and the DR service. Additionally, the DR configuration data includes a designation of the DR server as a DR server, a status of the primary server, and a mapping between the primary service and the DR service.

A first environment manager associated with the DR service can receive a first request for a first action from the DR service and request DR configuration data for the DR service from the environment management database. The first environment manager receives DR configuration data for the DR service from the environment management database, including the designation of the DR server as a DR server and the status of the primary server. The environment management database returns such DR configuration data to the first environment manager based on the mapping between the DR service and the primary service. Based on the DR configuration data, the first environment manager can determine if the status of the primary server is down, returning a wake action as the first action to the DR service when the status of the primary server is down and returning a sleep action as the first action to the DR service when the status of the primary server is not down. The DR service is adapted to wake up when the first action is the wake action and sleep when the first action is a sleep action.

Similarly, a second environment manager associated with the primary service can receive a second request for a second action from the primary service and request DR configuration data for the primary service from the environment management database. The second environment manager receives DR configuration data for the primary service from the environment management database, including the designation of the DR server as a DR server and the status of the primary server. The environment management database returns such DR configuration data to the second environment manager based on the mapping between the DR service and the primary service. Based on the DR configuration data, the second environment manager can determine if the status of the primary server is down, returning the sleep action as the second action to the primary service when the status of the primary server is down and returning the wake action as the second action to the primary service when the status of the primary server is not down. The primary service is adapted to wake up when the second action is the wake action and sleep when the second action is a sleep action.

In some embodiments, the first environment manager is adapted to determine if the primary service is awake and return the sleep action as the first action to the DR service when the primary service is awake and the second environment manager is adapted to determine if the DR service is awake and return the sleep action as the second action to the primary service when the DR service is awake.

In particular embodiments, the first environment manager and second environment manager are adapted to determine the first action and the second action based on a determination that the DR service is deployed on the DR server from the DR configuration data.

In another embodiment, the first environment manager is incorporated into the DR service and the second environment manager is incorporated into the primary service.

In other embodiments, the request for DR configuration data for the DR service includes a first service identifier for the DR service and the request for DR configuration data for the primary service includes a second service identifier for the primary service.

In a specific embodiment, the first request for the first action is sent by the DR service at a checking interval and the second request for the second action is sent by the primary service at the checking interval.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5-7 are diagram of embodiments of interfaces that may be utilized with embodiments of a service based disaster recovery system.

DETAILED DESCRIPTION

Figure 1A:
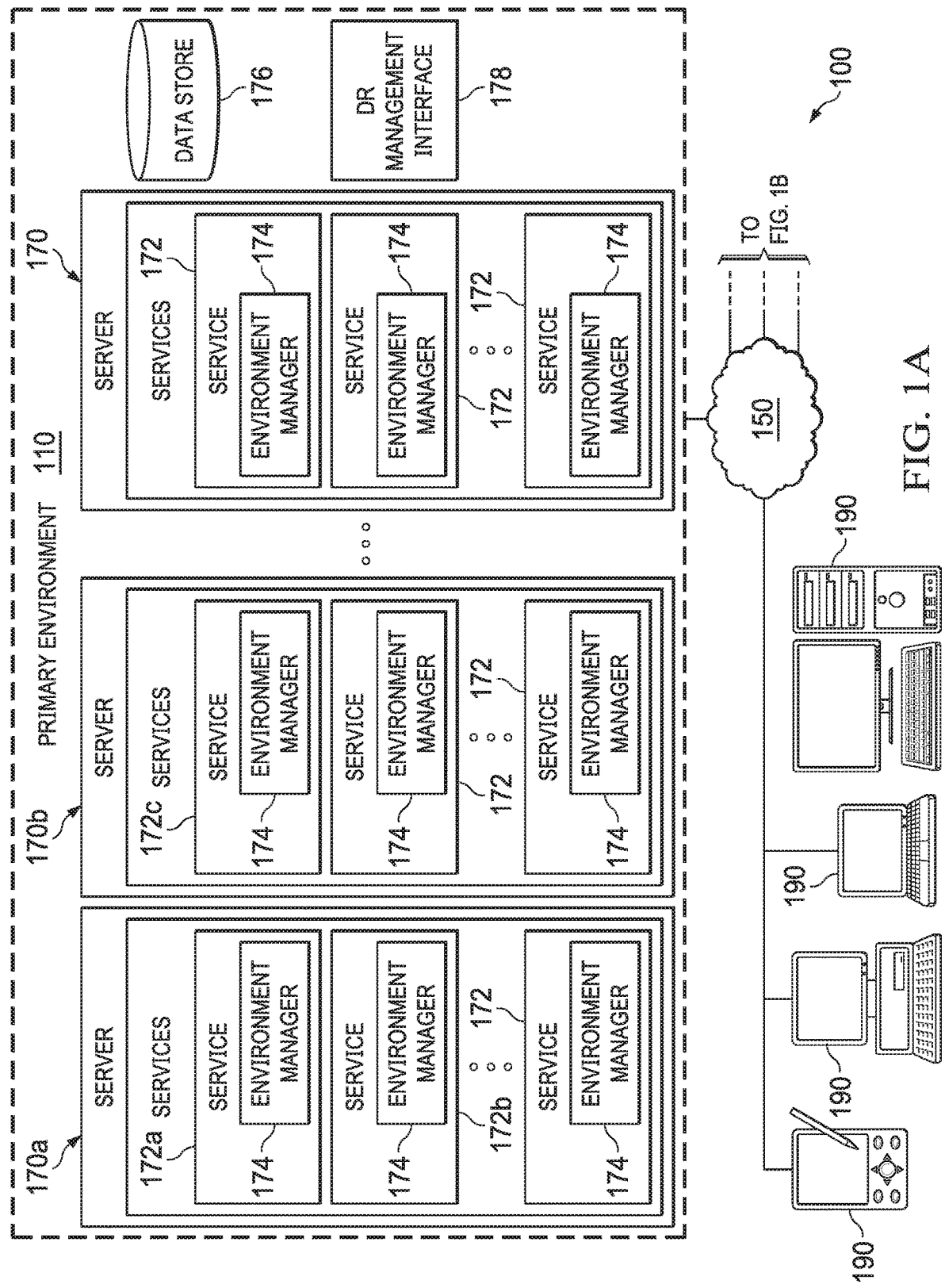
FIGS. 1A and 1B are a block diagram of a distributed networked computer environment including one embodiment of a service based disaster recovery system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. As discussed, it is now typical for an enterprise to utilize a highly complex distributed computing environment so that their personnel can access and utilize certain software applications and data. The continuous availability of the computer systems of these enterprise environments is thus vital to the operation of these enterprises. Accordingly, these enterprises take tremendous steps to ensure availability of these systems and data and to minimize what is referred to as "down-time" for these systems. These down-times can be caused by facility disaster, natural disasters, hardware failures, software application failures, purposeful attacks from virus or simply scheduled (e.g., periodic) maintenance of one or more of the computer system. To address these down-time issues many enterprises have implemented some form of disaster recovery (DR). Disaster recovery involves a set of policies, computing infrastructure, tools or procedures to enable the recovery or continuation of vital technology infrastructure and systems following a natural or human-induced disaster or other cause of failure or down-time for a primary computing environment.

Many of these DR configurations involve maintaining a dormant replica of servers of the primary computing environment at a secondary site or environment that is usually geographically separated from the primary environment. The state of the servers at the secondary site are synchronized with the state of the corresponding server at the primary site in order to reduce disruption when service is switched over to the secondary site upon loss of the server at the primary site. Accordingly, as each server within the primary computing environment at the primary site may have a number of applications (also referred to herein as services) executing thereon, a corresponding server within the DR computing environment at the secondary site will thus have those same applications (e.g., in the same state) executing on that server.

This requirement is impractical, as it requires an almost one to one correspondence between the configuration of the primary site and the DR site. Specifically, modern computing distributed enterprise computing environments then may have hundreds or thousands (or more) distributed servers with associated services. These services may be deployed on specific servers within the primary computing environment. To mirror this configuration then, a corresponding DR site may be required to have the same number of servers with the same service deployed on those servers in a manner that reflects or mirrors the deployment of those services within the primary computing environment. Moreover, when a failover is necessitated, this failover may be required to performed in a multi-step process, either manually or using previously configured third-party orchestration tool. Improved systems and methods for disaster recovery that provide for the simple configuration of primary or DR environments, and substantially automate failover and recovery in association with these sites.

To address these needs and problems, among others, embodiments as disclosed are directed to systems and methods for a service based disaster recovery system for a computing environment that includes a primary environment having primary servers with primary services, and a DR environment having DR servers with DR services. Embodiments may include the ability to configure and deploy the DR environment (e.g., through a configuration interface), including providing the ability to configure a DR service for one or more deployed primary services in the primary environment. An environment management database holds DR configuration data including the status of each service deployed in the computing environment. An interface may be used to initiate or terminate a failover for the entire computing environment or for a single server or service. Code or other logic built into the services to may identify an associated current state for the service and may perform activation (e.g., wake up) or enter a standby mode (e.g., sleep) depending on the identified state.

Figure 1B:
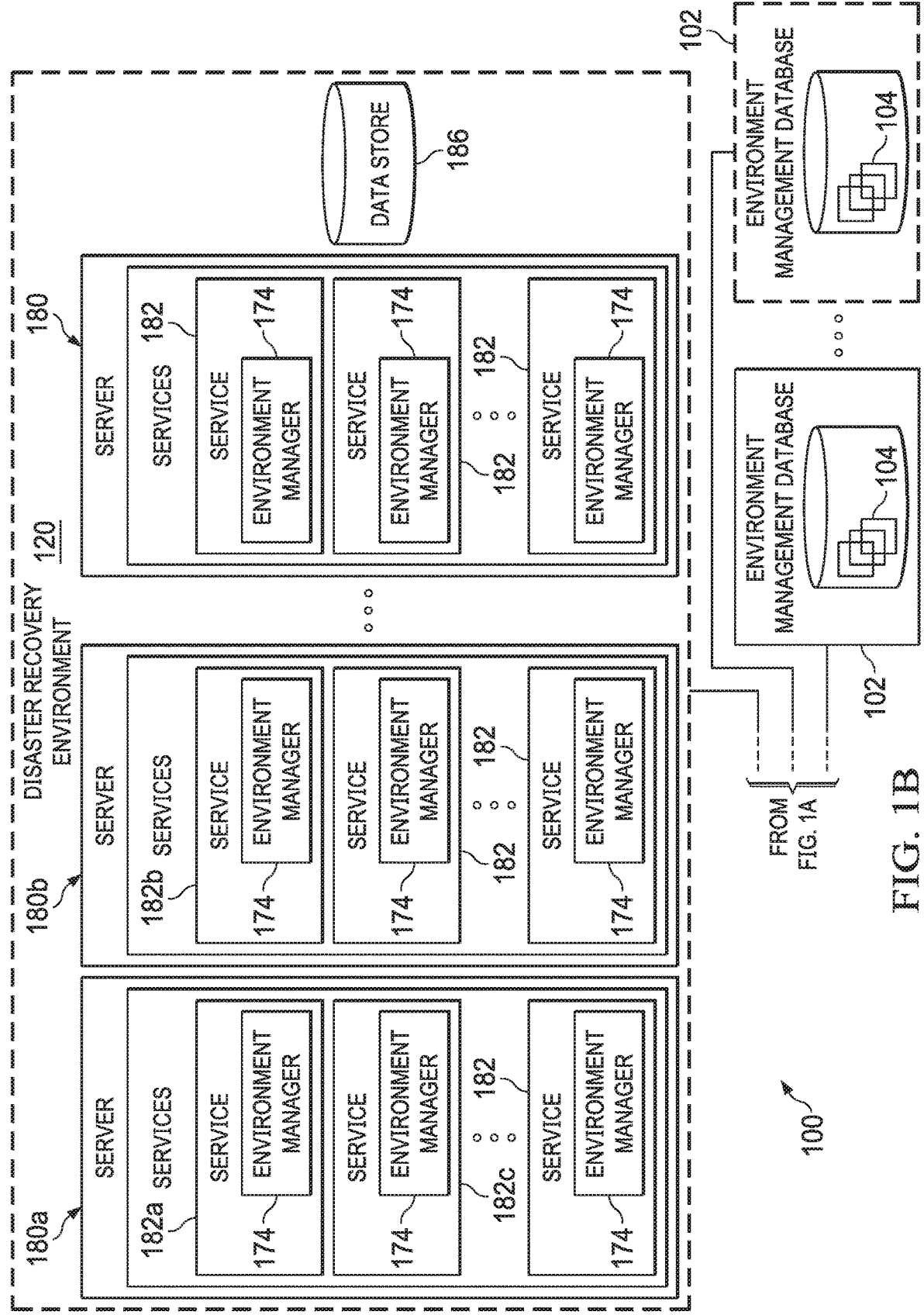

Referring then to FIGS. 1A and 1B, an embodiment of a service based disaster recovery system in a distributed computing environment 100 (e.g., for an enterprise) is depicted. Computing environment 100 may include primary computing environment 110 and DR computing environment 120 coupled to users 190 and an environment management database 102 over a computer network 150 (e.g., the Internet, an intranet, a Local Area Network (LAN) a Wide Arena Network (WAN), a wireless or cellular network, or some other type or combination of networks). The primary environment 110 may be the computing environment that is mainly used by the enterprise in its day to day operations, and may include services 172 deployed across servers 170 of the primary environment 110. These services may be the applications utilized by users 190 of the enterprise and may include, for example, file access manager services (e.g., for accessing files in data store 176), configuration services, storage services, mail services, or almost any other type of application that may be utilized in a computing environment.

DR computing environment 120 may also include services 182 deployed across servers 180. At least some of the service 182 of the DR computing environment 180 may be substantially identical or similar to services 172 of the primary environment 170. A data store 186 of the DR computing environment 120 may be a mirror or otherwise include data of the data store 176 of the primary environment 110. A DR configuration between the primary environment 110 and the DR computing environment 120 may be established by a user (e.g., at a user computing device 190, used herein interchangeably) associated with an enterprise (such as an administrator or the like) when the enterprise is establishing the DR computing environment 120.

To aid in configuring the DR computing environment 120, the DR system of embodiments may provide a DR management interface 178 such as GUI or the like that may be used by a user 190 to designate a DR configuration for computing environment 100, including defining primary servers 170 and primary services 172 of primary computing environment 110 and DR servers 180 and DR services 182 of DR computing environment 120, designating a primary server 170 of the primary computing environment 110 on which each primary service 172 is deployed, designating a DR server 180 of the DR computing environment 120 on which each DR service 182 is deployed, and designating a correspondence between primary services 172 in the primary computing environment 110 and DR services 182 in the DR computing environment.

In this manner, a primary service 172 on a primary server 170 and a DR service 182 on a DR server 170 may be defined as a DR service pair through the DR management interface 178. A DR service pair may include a primary service 172 on a primary server 170 of the primary environment and a corresponding DR service 182 on a DR server 180 of the DR environment 120. The definition of a primary service 172 and a DR service 182 as a DR service pair, indicates that when the primary service 172 is awake the DR service 182 should be asleep (e.g., in standby mode) and when the primary service 172 is asleep or otherwise unresponsive or down, the DR service 182 should be awake and servicing the requests (e.g., that would usually have gone to corresponding primary service 172).

Note here that while DR environment 120 and primary environment 110 and their respective servers 170, 180 and services 172, 182 have been depicted similarly in FIGS. 1A and 1B, it should be understood that servers 170 and 180 may be of different types and different configurations and that services 170, 180 of a DR pair may be deployed in servers 170, 180 of different types and that services 172 deployed together on a server 170 in production environment 170 may have corresponding DR services 182 in DR environment 120. Thus, for example, service 172*a* (in production environment 110) and service 182*a* (in DR environment 120) may be configured as a DR pair with service 172*a* deployed on server 170*a* and service 182*a* deployed on server 182*a*. Additionally, service 172*b* (in production environment 110) and service 182*b* (in DR environment 120) may be configured as a DR pair with service 172*b* deployed on server 170*a* and service 182*b* deployed on server 182*b*. Similarly, service 172*c* (in production environment 110) and service 182*c* (in DR environment 120) may be configured as a DR pair with service 172*c* deployed on server 170*b* and service 182*c* deployed on server 182*a*.

The DR configuration defined by the user through the DR management interface 178 may be maintained at environment management database 102. Specifically, as the user is defining the DR configuration for the computing environment 100 (or thereafter), the DR management interface 178 may store or update DR configuration data in the environment management database 102 to reflect the defined DR configuration. Environment management database 102 may store the DR configuration in a set of data structures 104 such as tables or the like. The database 102 may be a SQL or NoSQL datastore, may be a distributed datastore, or another type of datastore, without loss of generality. This environment management database 102 may be replicated (e.g., using SQL server replication or the like) such that multiple instances of the environment management database 102 and data structures 104 may exist in the computing environment 100.

The data structures 104 of the environment management database 102 may include a representation of the servers 170, 180 of each computing environment, a designation whether each server 170, 180 is part of the primary environment 110 or the DR environment 120, a representation of the services 172, 182 of each computing environment 110, 120, an identification of the server 170, 180 on which each of the services 172, 182 is deployed, and mappings between corresponding services in the primary and DR computing environments (e.g., the defined DR pairs of the computing environment 100). Thus, the stored DR configuration may include DR configuration data on primary servers 172 of the primary computing environment 110, the primary services 172 of the primary computing environment 110, and the primary servers 170 on which those primary services 172 are deployed (e.g., are executing). The DR configuration may also include DR configuration data on servers 180 of the DR computing environment 120, the DR services 182 of the DR computing environment 120, the DR servers 180 on which those DR services 182 are deployed, and a mapping between each DR service 182 and a corresponding primary service 172 (e.g., the defined DR pairs).

The environment management database 102 may provide an interface through which requests for this DR configuration data can be requested or retrieved. For example, this interface may receive a request for DR configuration data for a particular service 172, 182 (e.g., as referenced by the service identifier (ID) for that service) and may return associated DR configuration data for that service 172, 182 (e.g., associated with the service ID for that service in the DR configuration data stored in the environment management database), including for example, the server 170, 180 on which the service 172, 182 is deployed, the status or other data associated with that server 170, 180, the identification of any corresponding service 172, 182 and the status of the corresponding service 172, 182 or the server 170, 180 on which that corresponding service 172, 182 is installed.

Each service 172, 182 may utilize an environment manager 174 that may be utilized by each of the services 172, 182 (e.g., primary or DR services) deployed in each of the primary or DR computing environments 110, 120. This environment manager 174 may be code or a library incorporated into, or accessed by, a service 172, 182. The environment manager 174 may also be deployed remotely from the service 172, 182, and can be implemented, for example, as its own service (such as a web service or the like) that may be accessed by a service through an interface such as a web services interface or Application Programming Interface (API) or the like. The environment manager 174 may provide an interface through which a service 172, 182 can check to see if any action is required by that service 172, 182 (e.g., if that service should be asleep or awake). Based on the action returned by the environment manager 174, the service 172, 182, may wake up or go to sleep.

Additionally, at regular intervals (e.g., using a heartbeat message or the like) each service 172, 182 may report its status to the environment management database 102, which can record the status of that service 172, 182 in association with the representation of that service 172, 182 in the DR configuration data maintained by the environment management database 102. The environment management database 102 can then update the DR configuration data with a status for the service 172, 182 and the last time a message was received in association with the service 172, 182. In some embodiments, this heartbeat message may be sent through the environment manager 174. In these types of embodiments, the environment manager 174 may also offer an interface for such heartbeat messages such that a service 172, 182 may report a status through that interface and the environment manager 174.

In normal operation of the computing environment then, the primary services 172 deployed in the primary environment 110 are awake (or active). In other words, they may be actively servicing requests to allow users 190 (e.g., human or machine) to access the services 172 or functionality that they provide. At the same time, the DR services 182 deployed in the DR computing environment 120 are asleep or inactive. Thus, the DR services 182 may not be actively servicing requests or may not be allowing users 190 to access the services or functionality that they provide. However, even when asleep or inactive, these DR services 182 may still be up and running in a standby mode awaiting activation (e.g., to be given a "wake up" action, as will be discussed).

Additionally, at a regular interval (refer to as the checking interval and which may be a different interval or the same interval as the heartbeat interval used for heartbeat messages), each service 172, 182 may send a request or otherwise access the interface of the environment manager 174 to determine if the service 172, 182 should take an action. More specifically, the service 172, 182 may access the interface of the environment manager 174 with a service ID for the service 172, 182 to request an action check for the service 172, 182. The environment manager 174 can then return an action to take to the requesting service 172, 182, where this action may be a wake action or a sleep action. If the action is a wake action, and the service 172, 182 is not already awake, the service 172, 182 may wake up (e.g., by beginning to actively service requests to allow users 190 to access the services or functionality that the service provides). If the service 172, 182 is already awake, the service 172, 182 may wait for the expiration of a checking interval before checking again with the environment manager 174. If the action returned from the environment manager 174 is a sleep action, and the service 172, 182 is not currently asleep, the service 172, 182 may go to sleep (e.g., by stopping the servicing of requests or stopping the access of users 190 to the services or functionality that the service provides). If the service 172, 182 is already asleep, the service 172, 182 may wait for the expiration of the checking interval before checking again with the environment manager 174.

When the environment manager 174 receives a request from a service, therefore, it will make a determination of the action to return to the requesting service. To make such a determination, embodiments of an environment manager 174 may request DR configuration data associated with the service ID for the service 172, 182 from the environment management database 102. In response to this request, the environment management database 102 may return the DR configuration data associated with the service 172, 182, including DR configuration data on the server 170, 180 on which the service is deployed (e.g., including, for example, if that server 170, 180 is down). Moreover, if the requesting service 172, 182 is part of a DR service pair, the environment management database 102 may return DR configuration data on any corresponding service 172, 182 (e.g., if the service is a primary service 172, the corresponding service may be a corresponding DR service 182 while if the service 172, 182 is a DR service 182 the corresponding service may be a primary service 172) or server 170, 180 on which a corresponding service 172, 182 is deployed.

When the environment manager 174 receives the DR configuration data associated with the requesting service 170, 180 from the environment management database 102, it can determine if a corresponding service 172, 182 exists (or has been configured) from the DR configuration data associated with the service 172, 182 returned from the environment management database 102. If a corresponding service 172, 182 does not exist, the environment manager 174 may return a wake action to the requesting service 172, 182. If however, a corresponding service 172, 182 exists, it can then determine if the corresponding service 172, 182 is installed. This installation may mean that not only does the corresponding service 172, 182 exist but that, additionally, the service 172, 182 has been configured with a particular server 170, 180 and is executing on that server 170, 180. If a corresponding service 172, 182 is not installed, the environment manager 174 may return a wake action to the requesting service 172, 182.

If a corresponding service 172, 182 is installed, the environment manager 174 can then determine if the corresponding service 172, 182 is awake. If a corresponding service 172, 182 is awake, the environment manager 174 may return a sleep action to the requesting service 172, 182. If the corresponding service 172, 182 is not awake, the environment manager 174 can then determine if the primary server 170 of the primary service 172 of the DR pair including the requesting service 172, 182 is down. If the primary server 170 is down and the requesting service 172, 182 is the primary service 172 of the DR service pair, the environment manager 174 may return a sleep action to the requesting service 172, 182, while if the requesting service 172, 182 is not the primary service 172 the environment manager 174 may return a wake action to the requesting service 172, 182. Similarly, if the primary server 170 is not down and the requesting service 172, 182 is the primary service 172 of the DR service pair, the environment manager 174 may return a wake action to the requesting service 172, 182, while if the requesting service 172, 182 is not the primary service 172, the environment manager 174 may return a sleep action to the requesting service 172, 182.

When the requesting service 172, 182 receives the action returned by the environment manager 174, it can then take an appropriate action based on the type of the returned action. If the returned action is the same as the current state of the service 172, 182, the service 172, 182 may take no further action until the expiration of the checking interval at which point, the service may once again request an action from the environment manager 174. However, if the requesting service 172, 182 is asleep and the action is a wake action, the service 172, 182 may wake up (e.g., by beginning to actively service requests to allow users 190 to access the services or functionality that the service 172, 182 provides) and if the returned action is a sleep action and the service 172, 182 is not currently asleep, the service 172, 182 may go to sleep (e.g., by stopping the servicing of requests or stopping the access of users 190 to the services or functionality that the service 172, 182 provides). To ensure that both services of the DR pair are not simultaneously awake, in some embodiments before a service 172, 182 wakes up, it may check the status of the corresponding service 172, 182 of the DR pair as returned in the DR configuration data to ensure the corresponding service 172, 182 is idle or has not been active (e.g., as determined from its heartbeat message) for a certain threshold amount of time.

Figure 2:
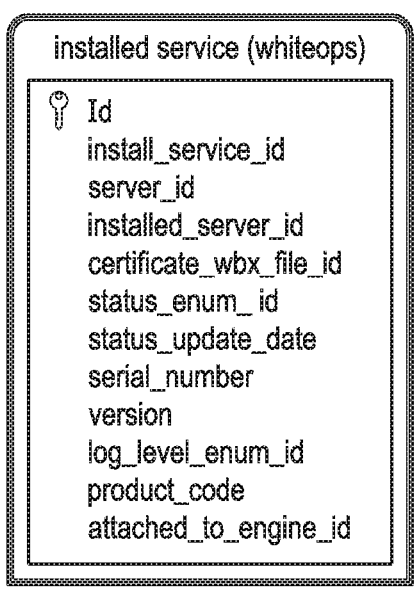
FIGS. 2-4 are block diagrams of embodiments of data structures that may be utilized by embodiments of an environment management database.
Figure 3:
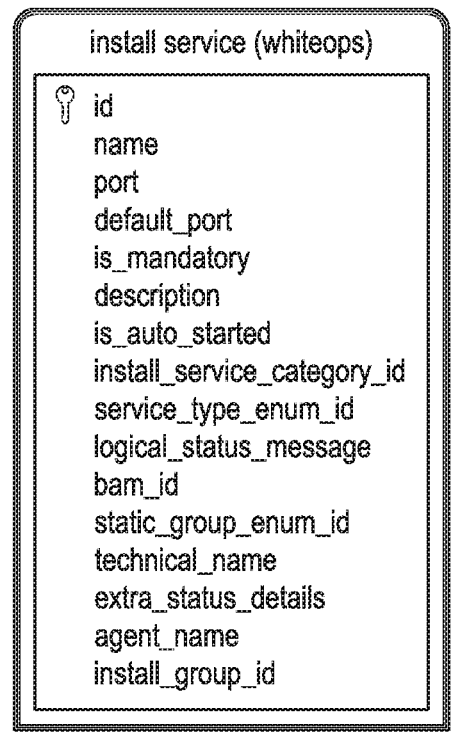
Figure 4:
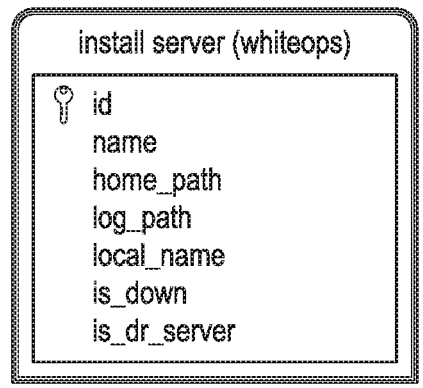

It may now be useful for an understanding of the embodiments as disclosed to describe embodiments of data structures that may be utilized by environment management database 102 to store DR configuration data (e.g., as configured by a user using DR management interface 178). FIGS. 2-4 depict embodiments of just such data structures. Turning first to FIG. 2, an embodiment of a table (e.g., here called an "installed_service" table) for storing DR configuration data representing an (e.g., installed) service is depicted. In a particular embodiment, certain fields of the table may include the following fields for a represented service in a computing environment:

| | |
|---|---|
| Id | The unique identifier of the service |
| Install_service_id | The id of the container service |
| Server_id | The ID of the server the service is configured to be install on. |
| Installed_server_id | The ID of the server the service is actually installed on |
| status_enum_id | An ID for the status of the service. In one embodiment the status may be one of the following:<br>Invalid = 0,<br>Starting = 1,<br>Running = 2,<br>Stopping = 3,<br>Broken = 4,<br>NotInstalled = 5,<br>UpdatingConfigurtion = 6,<br>NotResponding = 7,<br>StandBy = 8, |
| Status_update_date | The last time the service reported its status |

In FIG. 3, an embodiment of a table for storing DR configuration data representing a DR service pair (e.g., a virtual service that may be a combination of a primary service and a DR service) is depicted (e.g., here called an "install_service" table). In a particular embodiment, certain fields of this table may include the following fields for representing a DR service pair in a computing environment:

| | |
|---|---|
| Id | The unique identifier of the DR Pair |
| Name | A name of the service |

In FIG. 4, one embodiment of a table for storing DR configuration data representing a server in the computing environment is depicted (e.g., here called an "install_server" table). In a particular embodiment, certain fields of this table may include the following fields for representing a server in a computing environment:

| | |
|---|---|
| Id | The unique identifier of a (e.g., physical) server |
| Name | A fully qualified domain name (FQDN) name of the server |
| Local_name | The server name (e.g., as given by an administrator) |
| Is_down | An indication that the server was marked as down (or is not down) |
| Is_dr_server | Flag indicating if the server is designated DR server (e.g., in the DR computing environment) |

Figure 5:
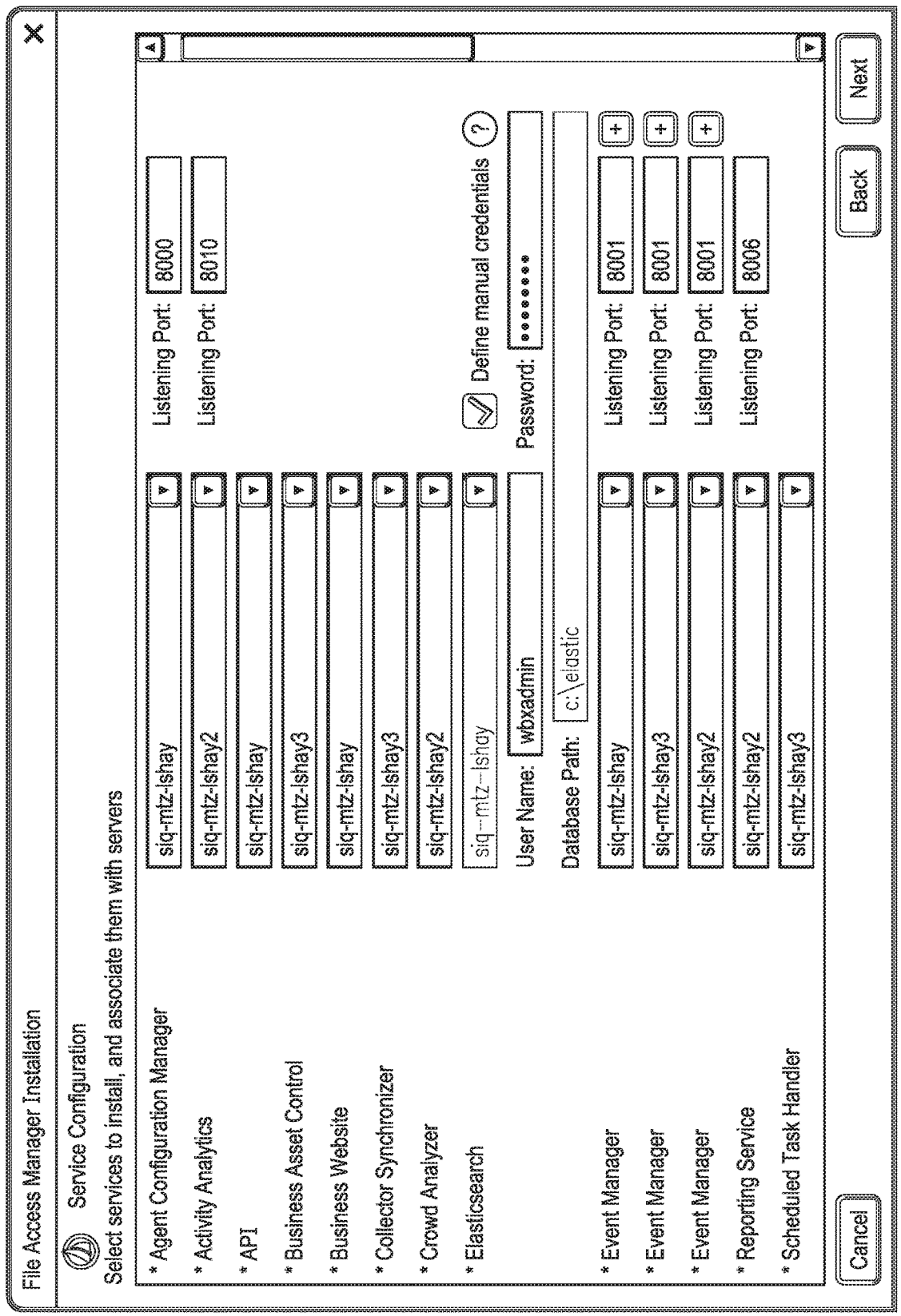
Figure 6:
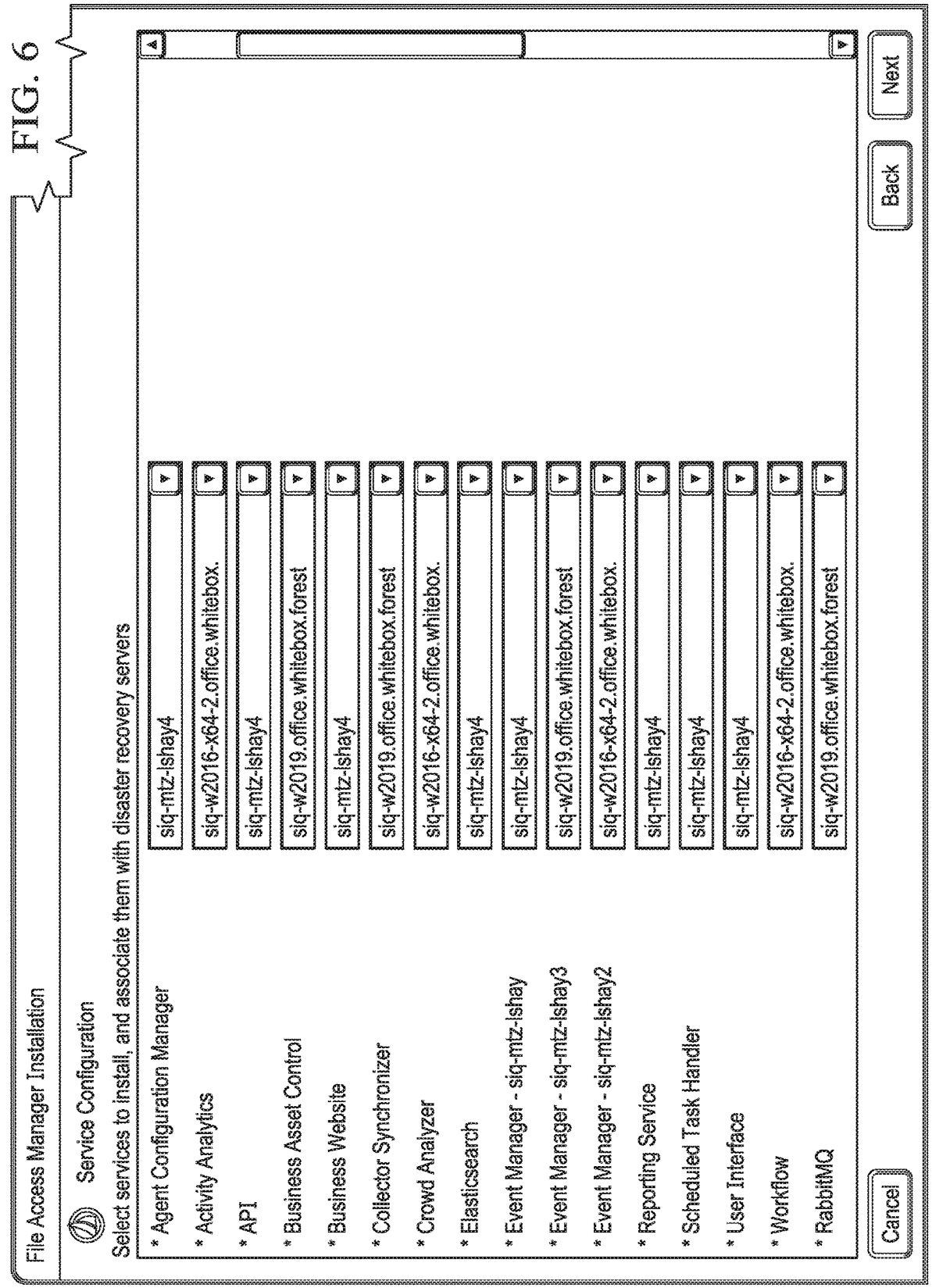

Moving now to FIGS. 5 and 6, examples of interfaces that may be provided by a DR management interface to a user to allow the user to configure the DR configuration data as stored in environment management database are depicted. In particular, FIG. 5 illustrates one embodiment of an interface that may be used to configure primary services on primary servers in the primary computing environment while FIG. 6 illustrates one embodiment of an interface that may be used to configure DR services on DR servers in the DR computing environment and to associate these configured DR services with a corresponding primary service to create a DR pair. When a user utilizes interfaces such as these to provide DR configuration data, the DR configuration data may be stored in environment management database in data structures such as embodiments of the tables as depicted previously.

Thus, a computing environment, including a primary environment and a DR environment with servers and services configured as discussed may operate normally according to such DR configuration data, whereby the primary services deployed in the primary environment are awake and the DR services deployed in the DR computing environment are asleep or inactive. At some point, however, for a variety of reasons, including facility disaster, natural disasters, hardware failures, software application failures, purposeful attacks from virus or simply scheduled (e.g., periodic) maintenance of one or more of the servers, it may be desired to take a server down (e.g., of the primary environment). To allow a user to designate a server in the computing environment to take down (and to allow a user to designate that the server is to be restored), embodiments of DR management interface may utilize an interface such as the embodiment of the interface as depicted in FIG. 7. Using embodiments of such an interface then, a user may designate a server as down (or being restored).

Figure 8:
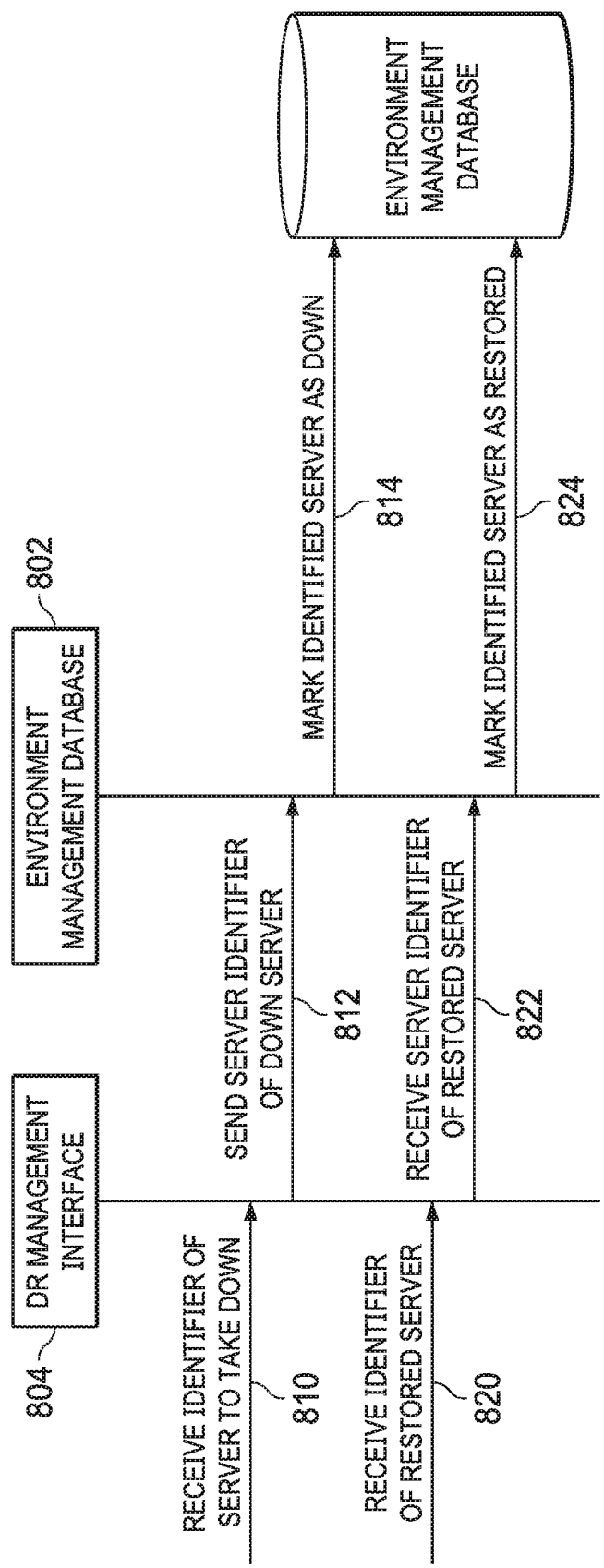
FIGS. 8, 9A and 9B are flow diagrams of the operation of embodiments of a service based disaster recovery system.

FIG. 8 depicts an embodiment of a flow diagram depicting the interaction of a DR management interface with the environment management database to designate a server as down or restored. Here, embodiments may provide an interface 804 (e.g., such as that depicted above with respect to FIG. 7) by which a user (e.g., an administrator associated with an enterprise or the like) may initiate a fail over by designating a server (e.g., a primary server in the primary environment) or even a particular service (e.g., a primary service in the primary environment) as down (STEP 810). This DR management interface 804 may interact with the environment management database 802 to indicate that the server or service indicated as down by the user through the interface 804 is indicated as such in the DR configuration data associated with that server or service (STEP 812). The environment management database 802 may then modify the DR configuration data to indicate that server is down (STEP 814). Specifically, for example, the environment management database 802 may access a row of the install_server table (e.g., as depicted in FIG. 4) associated with the identifier or the name of the indicated server as provided through the interface 804 and set a value in the "is_down" field for that row to indicate the server is down.

Thus, when the respective services of any DR service pairs associated with the server the user marked as down next requests an action status (e.g., through its environment manager), the DR configuration data returned to the environment manager from the environment management database 802 for that service will indicate the status of the server marked as down by the user. Each of the respective services of the DR service pairs associated with that server can then take the appropriate (e.g., wake or sleep) actions (e.g., without any further user involvement). Consequently, when a primary server is indicated as down by a user, the corresponding DR service for each primary service deployed on that server (e.g. indicated as down) will wake up and become active without any further involvement from the user, while each primary service deployed on the indicated primary server will sleep (if needed) without any further user involvement.

Similarly, the user may interact with the same interface 804 to designate a server (or service) as up (e.g., when it is desired to restore the server) (STEP 820). This DR management interface 804 may interact with the environment management database 802 to indicate that the server or service indicated as restored or up by the user through the interface 804 is indicated as such in the DR configuration data associated with that server or service (STEP 822). The environment management database 802 may then modify the DR configuration data to indicate that server is up (STEP 824). For example, the environment management database 802 may access a row of the install_server table (e.g., as depicted in FIG. 4) associated with the identifier or the name of the indicated server as provided through the interface 804 and set a value in the "is_down" field for that row to indicate the server is up.

When the respective services of any DR service pairs associated with the server the user marked as up next requests an action status (e.g., through the environment manager), the DR configuration data returned to the environment manager from the environment management database 802 for that service will indicate the status of the server marked as up by the user. Each of the respective services of the DR service pairs associated with that service can then take the appropriate actions (e.g., without any further user involvement). Thus, when a primary server is indicated as up by a user, the corresponding DR service for each primary service deployed on that primary server will go to sleep without any further involvement from the user, while each primary service deployed on the indicated primary server will wake up without any further user involvement.

Figure 9A:
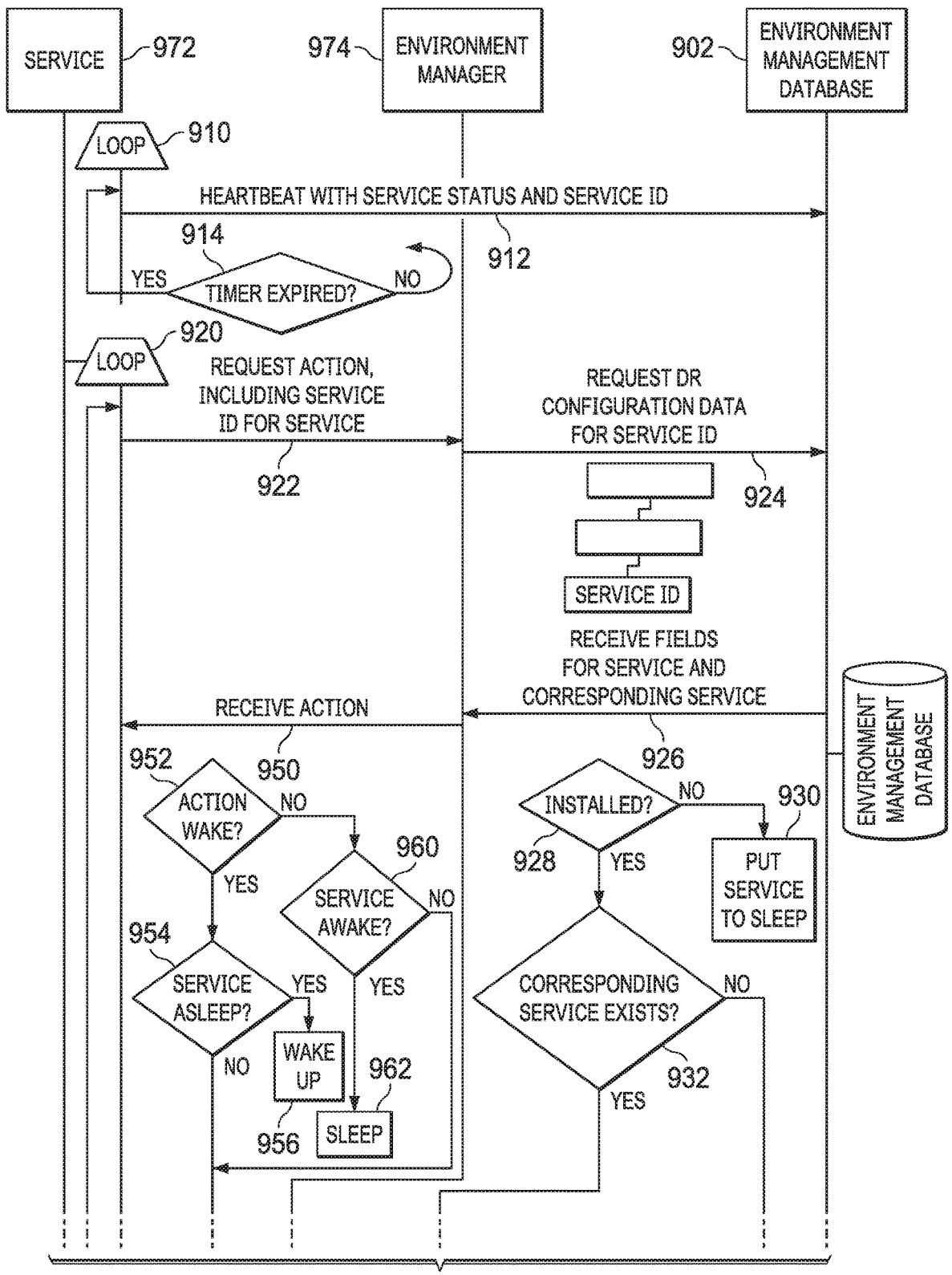
Figure 9B:
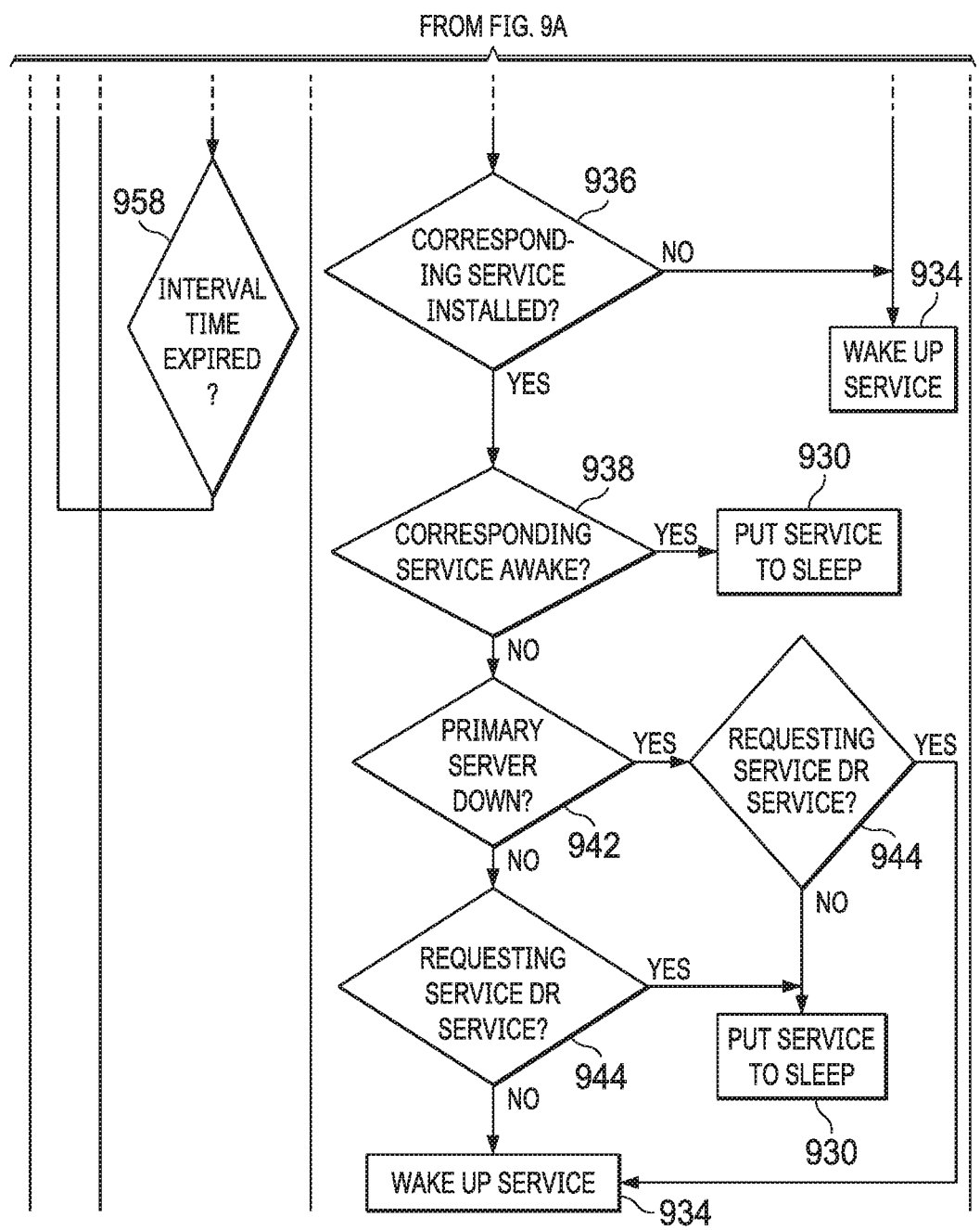

FIGS. 9A and 9B are flow diagrams depicting a method of this operation of the services of embodiments. Each service 972 may perform a heartbeat loop 910 where at regular intervals (e.g., using a heartbeat message or the like) the service 972 may report its status in association with the identifier for the service to the environment management database 902 (STEP 912), which can record the status of that service 972 in association with the representation of that service in the DR configuration data. In particular, the environment management database 902 can update the DR configuration data with a status for the service and the last time a message was received through the service. In one embodiment, for example, the environment management database 902 may locate the row of the "installed_service" table associated with the identifier of the service and may update the time in the "status_update_date" of that row to reflect the time that the status message was received by the environment management database 902. Additionally, the environment management database 902 may update the "status_enum_id" of the row associated with the service 972 to reflect the reported status (or a determined status) of the service 972. After the expiration of each heartbeat interval, (STEP 914), the service 972 may send another heartbeat message (STEP 912).

Each service 972 may also perform an action check loop 920 where at regular intervals (which may be a different interval or the same interval as the heartbeat messages), each service 972 may send a request or otherwise access the interface of the environment manager 974 to determine if the service 972 should take an action. More specifically, the service may access the interface of the environment manager with a service ID for the service to request an action check for the service (STEP 922).

When the environment manager 974 receives the request from the service 972, environment manager 974 will make a determination of the action to return to the requesting service. To make such a determination, environment manager 974 may request DR configuration data associated with the service ID for the service 972 from the environment management database 902 (STEP 924). In response to this request, the environment management database 902 may return the DR configuration data associated with the received service ID, including DR configuration data on the server on which the service 972 is deployed (e.g., including, for example, if that server is up or down) (STEP 926). Moreover, if the requesting service 972 is part of a DR service pair, the environment management database may return DR configuration data on any service corresponding to the requesting service 972 or server on which a corresponding service is deployed (e.g., if the service 972 is a primary service, the corresponding service may be a corresponding DR service while if the service 972 is a DR service the corresponding service may be a primary service).

Specifically, in one embodiment, the environment management database 902 may access the "installed_service", "install_service", and "install_server" to determine the rows of those tables associated with the service ID for the service 972 and the server on which the service 972 is deployed. From the values for the fields (e.g., the "install_service_id"), the environment management database 902 can also determine the rows of these tables associated with the corresponding service with which the requesting service 972 forms a DR pair. The value for the fields of these tables associated with the requesting service 972, the corresponding service of the DR pair including the requesting service 972, the server on which the requesting service 972 is deployed, and the server on which the corresponding service is deployed, may be returned back to the environment manager 974.

When the environment manager 974 receives the DR configuration data associated with the requesting service 972 from the environment management database 902, environment manager 974 can determine if the requesting service 972 is installed (STEP 928). The environment manager 974 may, for example, make such a determination based on the value of the "install_service_id" or the "installed_server_id" of the row of the "installed_service" table associated with the requesting service 972. If the requesting service 972 is not installed (N branch of STEP 928), the environment manager 974 may return a sleep action to the requesting service (STEP 930). If the requesting service is installed (Y branch of STEP 928), it can be determined from the DR configuration data returned by the environment management database 902 if a corresponding service for the requesting service 972 exists (STEP 932). This determination can be made, for example, based on whether the environment management database 902 returned any rows of the "install_service" table associated with the requesting service 972. If a corresponding service does not exist (or has not been configured) for the requesting service 972 (N branch of STEP 932), the environment manager 974 may return a wake action to the requesting service 972 (STEP 934).

If a corresponding service does exist for the requesting service (Y branch of STEP 932), the environment manager 974 can then determine if the corresponding service is installed (STEP 936). This installation may mean that not only does the corresponding service exist but that, additionally, the service has been configured with a particular server and is executing on that server. Thus, the environment manager 974 may, for example, make such a determination based on the value of the "install_service_id" or the "installed_server_id" of the row of the "installed_service" table associated with the corresponding service to requesting service 972 as returned by environment management database 902. If a corresponding service is not installed (N branch of STEP 936), the environment manager 974 may return a wake action to the requesting service 972 (STEP 934).

If a corresponding service is installed (Y branch of STEP 936), the environment manager 974 can then determine if the corresponding service is awake (STEP 938). If a corresponding service is awake (Y branch of STEP 938), the environment manager 974 may return a sleep action to the requesting service 972 (STEP 930). If the corresponding service is not awake (N branch of STEP 938), the environment manager 974 can then determine if the primary server of the primary service of the DR pair including the requesting service 972 is down (STEP 942). Again, this determination may be made based on the DR configuration data returned by the environment management database 902. Specifically, in one embodiment, the environment manager 974 will receive DR configuration data including the rows of the "install_server" table associated with both the server on which the requesting service 972 is deployed and the server on which the corresponding service (e.g., of the DR pair including requesting service 972) is installed. By referencing the "is_dr_server" field and "is_down" fields associated with both of these servers, it can be determined if the primary server is_down (e.g., by looking at the value of the "is_down" field for the row of the table with a value of "is_dr_server" that indicates the server is not a DR server).

If the primary server is down (Y branch of STEP 942), it can be determined if the requesting service 972 is a DR service or a primary service (STEP 944). This determination may also be made based on the DR configuration data returned by the environment management database 902. Here, in one embodiment, the environment manager 974 will receive DR configuration data including the rows of the "install_service" table associated with the requesting service. By referencing the "server_id" field and the associated value, the environment manager 974 may locate the row of the "install_server" table associated with the requesting service 972. By referencing the value of the "is_dr_server" of that table, the environment manager 974 can determine if the server on which the requesting service is deployed is a DR server (and hence whether the requesting service 972 is a DR service). If the requesting service 972 is a DR server (Y branch of STEP 944), the environment manager 974 may return a wake action to the requesting service 972 (STEP 934) while if the requesting service 972 is not a DR server (N branch of STEP 944), the environment manager 974 may return a sleep action to the requesting service 972 (STEP 930).

If the primary server is not down (N branch of STEP 942), it can similarly be determined if the requesting service 972 is a DR service or a primary service (STEP 944). If the requesting service 972 is a DR server (Y branch of STEP 944), the environment manager 974 may return a sleep action to the requesting service 972 (STEP 930) while if the requesting service 972 is not a DR server (N branch of STEP 944), the environment manager 974 may return a wake action to the requesting service 972 (STEP 934)

Thus, the environment manager 974 can then return an action to take to the requesting service 972, where this action may be a wake action or a sleep action. This action may be received by the requesting service 972 (STEP 950). If the action is a wake action (Y branch of STEP 952), and the requesting service 972 is asleep (Y branch of STEP 954), the service may wake up (STEP 956) (e.g., by beginning to actively service requests to allow users to access the services or functionality that the requesting service 972 provides). If the requesting service 972 is already awake (N branch of STEP 954), the service may wait for the expiration of the checking interval (STEP 958) before requesting an action again with the environment manager 974 (STEP 922). If the action is a sleep action (N branch of STEP 952), and the requesting service 972 is not currently asleep (Y branch of STEP 960), the requesting service 972 may go to sleep (STEP 962) (e.g., by stopping the servicing of requests or stopping the access of users to the services or functionality that the service provides). If the requesting service 972 is already asleep (N branch of STEP 960), the requesting service 972 may wait for the expiration of the checking interval (STEP 958) before requesting an action again with the environment manager 974 (STEP 922).

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A service based disaster recovery system, comprising:

a processor;

an environment management database storing DR configuration data associated with a primary computing environment, the primary computing environment comprising a primary server and a primary service deployed on the primary server and a disaster recovery (DR) environment comprising a DR server and a DR service deployed on the DR server, wherein the DR service corresponds to the primary service and the DR configuration data includes DR configuration data on the primary server, the primary service, the DR server and the DR service, including a designation of the DR server as a DR server, a status of the primary server, and a mapping between the primary service and the DR service;

a non-transitory, computer-readable storage medium, including computer instructions for:
a first environment manager adapted to:
receive a first request for a first action from the DR service;
request DR configuration data for the DR service from the environment management database;
receive DR configuration data for the DR service from the environment management database, including the designation of the DR server as a DR server and the status of the primary server, wherein the environment management database returns the DR configuration data to the first environment manager based on the mapping between the DR service and the primary service; and
determine if the status of the primary server is down, return a wake action as the first action to the DR service when the status of the primary server is down and return a sleep action as the first action to the DR service when the status of the primary server is not down, wherein the DR service is adapted to wake up when the first action is the wake action and sleep when the first action is a sleep action;
a second environment manager adapted to receive a second request for a second action from the primary service;
request DR configuration data for the primary service from the environment management database;
receive the DR configuration data for the primary service from the environment management database, including the designation of the DR server as the DR server and the status of the primary server, wherein the environment management database returns the DR configuration data to the second environment manager based on the mapping between the primary service and the DR service; and
determine if the status of the primary server is down, return the sleep action as the second action to the primary service when the status of the primary server is down and return the wake action as the second action to the primary service when the status of the primary server is not down, wherein the primary service is adapted to wake up when the second action is the wake action and sleep when the second action is a sleep action.

2. The system of claim 1, wherein the first environment manager is adapted to determine if the primary service is awake and return the sleep action as the first action to the DR service when the primary service is awake and the second environment manager is adapted to determine if the DR service is awake and return the sleep action as the second action to the primary service when the DR service is awake.

3. The system of claim 1, wherein the first environment manager and second environment manager are adapted to determine the first action and the second action based on a determination that the DR service is deployed on the DR server from the DR configuration data.

4. The system of claim 1, wherein the first environment manager is incorporated into the DR service and the second environment manager is incorporated into the primary service.

5. The system of claim 1, wherein the request for DR configuration data for the DR service includes a first service identifier for the DR service and the request for DR configuration data for the primary service includes a second service identifier for the primary service.

6. The system of claim 1, wherein the first request for the first action is sent by the DR service at a checking interval and the second request for the second action is sent by the primary service at the checking interval.

7. A method, comprising:
maintaining an environment management database storing DR configuration data on a primary computing environment comprising a primary server and a primary service deployed on the primary server and a disaster recovery (DR) environment comprising a DR server and a DR service deployed on the DR server, wherein the DR service corresponds to the primary service and the DR configuration data includes DR configuration data on the primary server, the primary service, the DR server and the DR service, including a designation of the DR server as a DR server, a status of the primary server, and a mapping between the primary service and the DR service;
at a first environment manager:
receiving a first request for a first action from the DR service;
requesting DR configuration data for the DR service from the environment management database;
receiving DR configuration data for the DR service from the environment management database, including the designation of the DR server as a DR server and the status of the primary server, wherein the environment management database returns the DR configuration data to the first environment manager based on the mapping between the DR service and the primary service; and
determining if the status of the primary server is down, returning a wake action as the first action to the DR service when the status of the primary server is down and returning a sleep action as the first action to the DR service when the status of the primary server is not down, wherein the DR service is adapted to wake up when the first action is the wake action and sleep when the first action is a sleep action;
at a second environment manager:
receiving a second request for a second action from the primary service;
requesting DR configuration data for the primary service from the environment management database;
receiving the DR configuration data for the primary service from the environment management database, including the designation of the DR server as the DR server and the status of the primary server, wherein the environment management database returns the DR configuration data to the second environment manager based on the mapping between the primary service and the DR service; and
determining if the status of the primary server is down, returning the sleep action as the second action to the primary service when the status of the primary server is down and returning the wake action as the second action to the primary service when the status of the primary server is not down, wherein the primary service is adapted to wake up when the second action is the wake action and sleep when the second action is a sleep action.

8. The method of claim 7, further comprising:
determining, at the first environment manager, if the primary service is awake and returning the sleep action as the first action to the DR service when the primary service is awake; and determining, at the second environment manager, if the DR service is awake and return the sleep action as the second action to the primary service when the DR service is awake.

9. The method of claim 7, further comprising:
determining, at the first environment manager, the first action based on a determination that the DR service is deployed on the DR server from the DR configuration data, and
determining, at the second environment manager, the second action based on the determination that the DR service is deployed on the DR server from the DR configuration data.

10. The method of claim 7, wherein the first environment manager is incorporated into the DR service and the second environment manager is incorporated into the primary service.

11. The method of claim 7, wherein the request for DR configuration data for the DR service includes a first service identifier for the DR service and the request for DR configuration data for the primary service includes a second service identifier for the primary service.

12. The method of claim 7, wherein the first request for the first action is sent by the DR service at a checking interval and the second request for the second action is sent by the primary service at the checking interval.

13. A non-transitory computer readable medium, comprising instructions for:
maintaining an environment management database storing DR configuration data on a primary computing environment comprising a primary server and a primary service deployed on the primary server and a disaster recovery (DR) environment comprising a DR server and a DR service deployed on the DR server, wherein the DR service corresponds to the primary service and the DR configuration data includes DR configuration data on the primary server, the primary service, the DR server and the DR service, including a designation of the DR server as a DR server, a status of the primary server, and a mapping between the primary service and the DR service;
at a first environment manager:
receiving a first request for a first action from the DR service;
requesting DR configuration data for the DR service from the environment management database;
receiving DR configuration data for the DR service from the environment management database, including the designation of the DR server as a DR server and the status of the primary server, wherein the environment management database returns the DR configuration data to the first environment manager based on the mapping between the DR service and the primary service; and
determining if the status of the primary server is down, returning a wake action as the first action to the DR service when the status of the primary server is down and returning a sleep action as the first action to the DR service when the status of the primary server is not down, wherein the DR service is adapted to wake up when the first action is the wake action and sleep when the first action is a sleep action;
at a second environment manager:
receiving a second request for a second action from the primary service;
requesting DR configuration data for the primary service from the environment management database;
receiving the DR configuration data for the primary service from the environment management database, including the designation of the DR server as the DR server and the status of the primary server, wherein the environment management database returns the DR configuration data to the second environment manager based on the mapping between the primary service and the DR service; and
determining if the status of the primary server is down, returning the sleep action as the second action to the primary service when the status of the primary server is down and returning the wake action as the second action to the primary service when the status of the primary server is not down, wherein the primary service is adapted to wake up when the second action is the wake action and sleep when the second action is a sleep action.

14. The non-transitory computer readable medium of claim 13, further comprising:
determining, at the first environment manager, if the primary service is awake and returning the sleep action as the first action to the DR service when the primary service is awake; and
determining, at the second environment manager, if the DR service is awake and return the sleep action as the second action to the primary service when the DR service is awake.

15. The non-transitory computer readable medium of claim 13, further comprising:
determining, at the first environment manager, the first action based on a determination that the DR service is deployed on the DR server from the DR configuration data, and
determining, at the second environment manager, the second action based on the determination that the DR service is deployed on the DR server from the DR configuration data.

16. The non-transitory computer readable medium of claim 13, wherein the first environment manager is incorporated into the DR service and the second environment manager is incorporated into the primary service.

17. The non-transitory computer readable medium of claim 13, wherein the request for DR configuration data for the DR service includes a first service identifier for the DR service and the request for DR configuration data for the primary service includes a second service identifier for the primary service.

18. The non-transitory computer readable medium of claim 13, wherein the first request for the first action is sent by the DR service at a checking interval and the second request for the second action is sent by the primary service at the checking interval.

* * * * *